Patented Feb. 11, 1936

2,030,239

UNITED STATES PATENT OFFICE 2,030,239

METHOD OF TREATING VERMICULITES

William Berthier Byers, Kansas City, Mo.

No Drawing. Application July 17, 1933,
Serial No. 680,787

16 Claims. (Cl. 252—1)

My invention relates to a method of treating vermiculites, and particularly to a method of treating vermiculites in a manner to increase the extent of exfoliation thereof to produce a product that is composed of smaller and thinner scales or plates than would be otherwise possible. This application is a continuation in part of my application Serial No. 629,049, filed August 16, 1932, and is co-pending with my application Serial No. 636,334, filed Oct. 5, 1932.

The minerals that are known as vermiculites, while having different properties and being known under many different names, most of which do not particularly identify the characteristics of the particular kind of vermiculite carrying the name, all have the general characteristics that they will expand upon heating due to parting of their cleavages to various degrees, this characteristic being known as partial exfoliation; they were all formed from micaceous materials by natural processes; and they are composed mainly of hydrous magnesium aluminum silicate.

The characteristics that these vermiculites will have after heating to expand the same, will vary considerably with the kind of vermiculite that has been treated and the manner in which the treatment has been carried out. In fact the variation, which is largely due to the variable characteristics of the material before heat treatment, is so great that on the one hand the material may be brittle, and on the other hand it may be flexible after expansion. It may yield a material that will produce a superior plastic, or one that is only slightly or not at all plastic. It will yield extremely thin laminations or scales when comminuted or ground, or will yield only quite thick laminations or scales more in the nature of small compressed flakes or granules when comminuted or ground. The expanded material may have a matt surface or a vitreous surface, the character of the surface determining to a large degree the binding qualities of the material. It may be easily powdered or very tough. It may have a chalky or talc-like texture, or a micaceous, paper-like texture when ground to pass through a 200 mesh sieve, or finer. It will yield a light, fluffy powder weighing from 6 to 10 pounds per cubic foot, or a heavier product weighing from 12 to 40 pounds per cubic foot, depending on the heat treatment, the variety of vermiculite and the method of grinding.

Due to the lack of uniformity in the produce obtained by previously known methods of expansion, and due to the wide variation in characteristics of vermiculites found in different places, and even of vermiculites found in the same deposit, and even in small pieces of the mineral from the same deposit, the only commercial uses of vermiculite that have been attended with much success have been to use it as a loose fill insulation and as a volume filler in granular form for such materials as cement, plaster or asphalt, for the purpose of lessening the weight of the finished product and obtain the little insulating or sound deadening value that could be obtained thereby.

The flakes or granules of vermiculite that have been used in compositions in an attempt to make a molded or similar product that has insulating and sound deadening properties, have a heat transmission value of .56 to 1. plus B. t. u. at about 100 degrees temperature per inch thickness difference. Upon mixing, kneading or crushing these granules within a plastic mass the result of the expansion of the granules is partially destroyed and the material that has been so kneaded or crushed has a rating of at least .75 to 2 B. t. u. at around 100 degrees temperature difference, or in other words, the heat transmitting characteristic of the material has been increased to approximately double what it was before compounding into a block. All these values are much too high for commercial uses. In order to remedy this deficiency diatomaceous earth, mineral wool, and magnesia have been mixed with such heat treated vermiculite, but with little success. At still higher temperature differences, such as from about 250 degrees to 1500 degrees, the heat insulating ability of such a flake, granular, expanded vermiculite is much less, in proportion, than at the lower temperature differences, due to the absence of trapped air cells in the expanded material or the product containing such expanded material, resulting in convection air currents through granules even as small as $\frac{1}{16}$ to $\frac{1}{8}$ inch in diameter, which ruin the possibility of a high insulating efficiency in such granular material.

It is a particular purpose of my invention to treat the vermiculite mineral in such a manner as to produce a material of a more uniform character than that previously produced by expansion by heat, and which does not have any granules, but which is made up of thin, warped plate-like crystals of 1/100 mesh down to 1/2000 mesh, or finer, and which collectively constitute a light material of the character of an impalpable powder and which can be utilized in making a product made from plastic material, that has high heat insulating and sound deadening qualities or other such advantageous characteristics as wil be pointed out below.

A more specific object of this invention is to provide a method of treating the varieties of vermiculite which are flexible; in distinction from the varieties which are brittle; in such a manner that the cleavages in said flexible vermiculites are opened up to greater extent and in greater number than when heat treated only; thereby producing a friable and powdery flake or granule instead of a flexible one, as is ordinarily obtained. With the granule in this friable condition it is easily reduced to the desired impalpable powder, while a flexible granule is very difficult, if not impossible, to reduce to such sizes.

Another purpose is to produce from the vermiculite a powder of extremely thin plate-like crystals having a greater surface area in proportion to their volume than any other mineral particles of similar meshes, such as, for instance, powdered limestone, slate dust, Portland cement, ground mica, clay, etc. Flexible vermiculites as heretofore used in molded mixtures, have been employed in flake form as volume ingredients to increase the bulk or decrease the weight of the mixture. By distintegrating the flakes or granules of expanded vermiculite into the individual minute scales which compose them, the resulting material becomes a new surface area ingredient that can be used in plastic mixes giving new values of surface tension relations in the mix due to the greatly increased area of the vermiculite particle surfaces over other previously used mineral powder surfaces per unit of weight. Properly prepared thin, flat vermiculite scales have a surface area to volume ratio of 4 to 8 times greater than the surface area to volume ratio of ordinary rounded or angular particles of other minerals of the same mesh size.

Named varieties of vermiculite have been named mostly after the locality where they are found, or after the person who discovered them and are known by such names as kerrite, maconite, Bear Creek vermiculite, zonolite, jeffersite, etc., but the names are of no aid in classifying the vermiculite according to their principal characteristics, which result in differences in the resulting product when the same are heated to expand the same. Vermiculites that act very similarly have different names, while some which vary widely from named varieties are unnamed and unclassified at the present time. Also different portions of a deposit of any of the named varieties vary some in characteristics before treatment and after treatment. My examination of about 150 different varieties of vermiculites has shown that the proper classification thereof is based upon the effect of the action of heat upon vermiculites, as it is this property that makes them available for industrial uses.

The only advantages gained from using vermiculites for any purpose is due solely to the multiplicity of cleavage planes they contain and to the extent I am able to open them. Vermiculites generally can be classified into two well defined types, flexible and brittle, each yielding different type materials upon treatment thereof to expand the same. Vermiculite is the first stage of the transition of magnesium micas by the prolonged action of underground waters into talc, kaolin or clays, and the difference between a true mica and a vermiculite is more physical than chemical. True micas and flexible vermiculites have almost identical chemical compositions, the difference being only in the strength of the bond between the planes of cleavage of the crystals. Vermiculites are micas that have been acted upon so as to have weaker bonds between the planes of cleavage, this weakening along the planes of cleavage extending from the largest to the most minute planes. That this weakness of the bond between the planes of cleavage has been brought about by a solvent action on the mica is evident upon examination of some of the material under the microscope, as figures or cavities are etched on the crystals, these being obviously produced by some solvent action that has taken place while the mica was in the ground. This weakened condition is not produced in like amount or to the same extent in all the planes of cleavage because the solvent action is progressive from the larger principal planes to the smaller ones. It is well known that when a crystal or cleavage is attacked by a solvent, the action proceeds with different velocities in crystallographically different directions and if stopped before the solution has proceeded far, the crystal faces are often pitted with little cavities of definite shape. Such pitted surfaces are general characteristics of vermiculite, but not of mica. By cleavage is meant the characteristic of a mineral whereby separation can be obtained in any part of the crystal and there is only a mechanical limit of the thinness of the resulting plates.

While most micas are resilient, that is, a thin plate will bend and spring back when the bending force is removed, vermiculites are either flexible or brittle, but never resilient except in the finer divisions. This is due to the fact that the bonds at the planes of cleavage are too weak to stand a slight bending force and are ruptured in proportion to the displacement that takes place in bending. As previously stated, there are practically no distinguishable chemical differences between vermiculites and micas. This is particularly true of the flexible vermiculites as these have had a minimum amount of solvent action take place on the crystal faces. The more brittle the vermiculite becomes by solvent action the more it is altered from the original mica chemically. Vermiculites are found in almost every form in which micas occur except resilient sheets. Vermiculites occur as disseminated six-sided scales, as masses of coarse or fine scales, sometimes grouped in globular or plumose forms. Also as rough six-sided prisms with planes of cleavage normal to the axes of the prisms. All vermiculite crystals belong to the mono-clinic system. Vermiculites contain chemically combined water in amounts varying from 5 to 15 per cent. The amount of water present is, however, not the only factor that determines the amount of expansion that takes place in a heat treated vermiculite, and unless all conditions are favorable for a maximum expansion vermiculites with 5 per cent of water will yield a lighter product after heating than those containing 15 per cent water.

The scales or plates of all micas and vermiculites have a strong tendency to warp when heated strongly, and it is this warping that causes the expansion of the material. The dehydration causes unequal strain within the crystals when the water is expelled, and this strain causes them to warp and twist. The reason vermiculite expands is because the bonding of the planes of cleavages is weaker than the warping and twisting force and the plates are pressed apart, while in micas the bonds between the planes of cleavage are stronger than the twisting force, which results in some warping and twisting of the whole sheet, with some spreading thereof or a trace of swelling, but with no such expansion as occurs on heating a vermiculite in which the crystals are less tightly bound due to the natural solvent action along cleavages before the subsequent heat treatment. Warping occurs only while the water is being driven off and a de-hydrated vermiculite will not warp or expand further with subsequent heating.

When vermiculites are heated rapidly there is always a sharp cracking noise caused by the bonds at the cleavage planes being broken suddenly. The more instantaneously the vermiculite is heated the greater will be the strains set up in a given area, with the result that cleavage planes are opened to a greater extent and more of them than by slow heating. While it is possibly the case that the explosive action of the water vapor released from the crystals aids in this instantaneous expansion, it is not the expanded water vapor that is the cause of the expansion. Vermiculites can be heated so slowly that it takes thirty minutes or more to release the water therefrom and expansion will still take place, and it is obvious that so small an amount of water vapor escaping over such a prolonged period could not develop enough pressure to cause expansion.

There is never 100 per cent parting of any single cleavage, for when each plate warps or breaks away from the adjoining plates enough to relieve its internal strain or stress, further parting along those particular planes is stopped, and as a result after heat treatment there are thousands of small plates stuck together by fractional portions of their surface areas to their adjacent plates. This makes what might be called a flake or granule of expanded vermiculite. All vermiculites expand by heat treatment into such granular forms. So small a portion of the cleavages are usually opened by heat treatment of the flexible vermiculites that the flakes still remain flexible, for obviously if they were opened almost entirely the flakes would be friable or powdery. The pieces of mineral swell in a direction perpendicular to the planes of cleavage, and the size of these expanded granules depends upon the size of the vermiculite pieces which were heated. The usual size of the pieces before heat treatment will vary from about the diameter of fine sand to a diameter of $3/8$ to $1/2$ inch, and the total increase in volume caused by increase of the third dimension of the piece will vary so as to be from 4 to 12 times the volume of the pre-heated material.

The only chemical change that takes place in heating vermiculites below their point of sintering, is de-hydration and slight oxidation of such elements as iron, which may be present, and loss of such volatile elements as fluorine. Vermiculites that contain an unusually large amount of oxidizable iron are almost completely destroyed in crystalline structure because of the oxidation that occurs during heating and the resulting product when powdered is no longer crystalline or plate-like, but breaks along other lines as easily as along cleavage lines producing heavy red dust, which is worthless as comprising plate-like thin scales.

The nature of the crystallization of the mica from which the vermiculite was formed by natural process, as well as the amount of solvent action which has taken place, determines the nature of the expansion of the vermiculite under action of heat. Those having large crystals, some being as much as a foot or more across, are more homogeneous and have more regular and even sized cleavages than a vermiculite composed of smaller loose scales of from $1/8$ to $1/4$ inch in size. The planes between adjacent crystals of the micas from which these vermiculites were formed which grew from separate starting points are probably more accessible to water action at first than cleavage planes within a crystal which grew from a single starting point. These cleavages within a crystal are of different degrees, such as perfect, distinct, and difficult. The water action starts along the perfect cleavages and extends to the more difficult in progressive degrees.

The small loose scale vermiculites are usually of the brittle type and have been etched out along cleavages more easily and quickly, and are therefore usually etched to a greater extent than those forms that have the larger homogeneous crystals. The result of this easy accessibility of water action is that the small loose scale type of vermiculites usually have received a rather quick and extreme solvent action along the more distinct cleavage planes and little solvent action along the finest least sharply defined cleavage planes, and are always brittle to a degree corresponding to the amount of solvent action that has taken place, and are easily powdered to a fineness determined by the extent of that action. They are consequently further advanced toward the kaolonic, or more likely the talc stage, than flexible vermiculites, which have been less altered by solution. Friable or brittle vermiculites always yield a friable expanded granule after heating, a portion of which may be composed of small flexible particles contained within the granules. These particles have the most difficult cleavages of the material and were not altered to brittleness during the natural solvent action.

Due to the thinness of the plate-like particles or scales it is impossible to determine what takes place in the expansion of these vermiculites and what the differences in the products resulting from different vermiculites is without microscopic examination of the powders resulting therefrom after heating and powdering the same. The magnification best suited for this work is from 80 to 400 diameters and the best method to follow in order to observe the shape of these scales or particles or plates is to place vermiculite powder in volume equal to about that of a mustard seed on a glass slide and wet the same with two or more drops of water. This thoroughly disperses the powder in the water and a small current is set up in the liquid either by slightly tipping the stage of the microscope or by touching the water at intervals with a small pointed object. These currents cause the vermiculite particles to flow with the current and many of the particles will roll over as they flow, giving a clear view of their edges as they roll, as well as their relatively large warped surfaces. Such observation is necessary because vermiculites are quite transparent and some almost colorless, and the observation of the exact character of these scales cannot be made in any other way. By careful observation and classification of the types of particles observed in vermiculite powders, it is possible to determine the physical properties of any vermiculite powder by microscopic analysis.

When flexible vermiculites, which are usually the large crystal type, are expanded by heat action different portions of each piece expand to different degrees on account of the uneven natural solvent action. This gives the resulting granule or flake the appearance of being composed of a large number of relatively thick flexible swelled laminations, spaced and held together by very loosely bound material made up of much smaller plates. What is commercially known as zonolite mined at Libby, Montana, is a typical example of this type, and when heat-expanded in a manner old in the art, yields tough, flexible granules expanded to variable degrees throughout the mass. Similar material is also found near Casper, Wyoming, and Buena Vista, Colorado.

In some cases the smaller and loosely bound plates just referred to are so very fine and thin that they have approximately reached their mechanical limit of thinness. These might be designated as completely exfoliated material obtained from such vermiculites. When these vermiculites are expanded in rotary kilns the tumbling of the flakes over each other in the kiln releases much of this fine plate-like powder and it is blown out with the burnt fuel gases and recovered from them as a vermiculite flour. The remaining portion may be recovered from the granule by grinding and air separation. In no case by present methods is the yield of this fine plate-like powder more than 40% of the weight of the granules and is often much less; average flexible vermiculites usually yielding 5% to 10%.

The remaining material in the granule cannot be ground by dry grinding into these plate-like particles because of the toughness and flexibility of the material. The product formed when this latter material is ground to small meshes of 100 or 200 to the inch, is in effect a smaller granule in these smaller sizes; but compressed and flattened by the grinding operation. The small proportion of flexible plate-like powder produced has many properties different from a brittle vermiculite powder, which makes it suitable for many purposes where brittle vermiculite flour could not be used. One outstanding superiority is that such flexible plate scale material can be prepared (by my method) as a powder consisting of a graded aggregrate of plates from 1/100 inch on down to 1/2000 inch in their largest dimensions and with a weight per cubic foot no greater than the weight of the large expanded granules from which it was made. This is obviously possible only through the most minute subdivision into plate-like forms. The thickness of these plates I have observed is about 1/10 to 1/50 of their widest dimension.

Some of the properties of this flexible plate-like powder are:—It is composed of both ragged and smooth flexible scales giving it a fluffy or downy texture in the dry state. It is usually shades of tan, buff or cream without the metallic luster of the granular material. It has a flocculent tendency when suspended in water and molds into a block of fair strength when dry, without the use of any binders. Blocks made from it have a papier-mâché-like texture and weigh about 20 to 24 pounds per cubic foot when made from 8 to 10 pounds per cubic foot dry powder. The finer particles of such a powder exhibit the colloidal properties of clay in that a few drops of an alkali in the nature of sodium silicate added to a thick cream-like paste of the material deflocculates it and makes the mass more liquid.

Wet grinding of a flexible granule produces smoother scales than dry grinding. Such smooth scales have more of a tendency to deflocculate than the more ragged scales obtained by the dry method. Such smooth scales without binder make a block equal to dried clay in strength and are a very efficient form of high temperature insulation due to the slightly warped scales all bedding in parallel planes in the block forming a highly laminated structure. The amount of warpage is comparatively small, and the scales may be likened to torn paper or confetti except for size, the scales being microscopic in size.

The powders obtained from brittle vermiculites on the other hand are more harsh and gritty. They have a chalky or earth-like feel due to the fragility of the plates and the large amount of broken plates in such material. Such material will not form a molded dried mass without the addition of other ingredients of a binding nature. Wet grinding of expanded brittle vermiculites produces a pulp-like mass of very little microscopic plate structure over what would be present in a talc. Due to the inability to preserve the plate formation in brittle vermiculites during grinding, they become considerably heavier the finer they are ground. This is a decided difference from flexible plate-scale powders. It must be undertood that since vermiculites are natural products no two are exactly alike and it is only by careful examination and the application of appropriate methods of expansion, grinding, screening or air floatation, etc. that a homogeneous and uniform product can be obtained from them.

As stated before, the object of this invention is to provide a method of producing microscopic flexible, warped plates from vermiculites. Brittle vermiculites are easily powdered and may produce a small portion of such flexible plate material, but as a whole the powder obtained from brittle vermiculites is not a truly plate-like material. The reason for this is that solvent action has proceeded too far and the subsequent heat treatment and grinding operations break a very large proportion of the fragile scales into dust-like and needle-like particles. With flexible vermiculites solvent action has not proceeded far enough to cause them to become friable by heat treatment, and the tough flexible flakes or granules cannot be disintegrated into their component tough flexible scales. The ideal vermiculite would be one that has had just sufficient solvent action to loosen the planes, but not weaken the crystals by excessive chemical solution so that when the material was heated it would expand into a friable flake composed of tough flexible crystals of 1/100 to 1/2000 mesh. This ideal vermiculite has not yet been found produced by nature. Some vermiculites approach it more nearly than others. By methods to be described later, any flexible vermiculite can be artificially opened along more and finer cleavage planes than by heat treatment alone as ordinarily carried out so that the flexible flakes or granules actually do become friable to a predetermined extent and can easily be powdered to crystals in the form of thin flexible plates of more or less predetermined size.

Other objects and advantages of the invention will appear as the description thereof proceeds. I desire to have it understood, however, that I do not intend to limit my invention to the specific details of the method described, but that I intend to include all such modifications thereof as would fall within the scope of the claims.

No vermiculite is found in nature altered just sufficiently all the way through to produce a micaceous flour of flexible plates of a thinness which approaches their mechanical limit. The item of plate thinness is the only advantage of vermiculites over ground micas. Brittle vermiculites are altered too far and produce as thin a plate as required, but they are brittle plates and do not have the structural strength to stand working up as a plastic into molded articles without excessive breakage. Flexible vermiculites are not altered enough to induce enough cleavage separation by heat action alone to produce a very large amount of flour. In other words, the cleavages are still too strong and difficult.

Since strains set up within the crystals by the removal of water causes plate warpage and expansion of the vermiculite, any additional means that can be used to set up additional strains and plate warpage after the water is removed, will increase the yield of flexible plate-like flour by further warpage and cleavage separation.

One method of accomplishing this result is to expose the material while in the expanding chamber, to the action of such a substance as sodium vapors derived from sodium chloride or carbonate. After the water is removed from the vermiculite, and the temperature of the material continues to rise within the expanding chamber, a temperature is soon reached where the heat ionized sodium begins to dissolve into the faces of the crytals causing shrinkage strains along the crystal faces. This causes more crystal warpage and opening of more cleavages. It has been found that time is an important element in this process, because as each of the plates warps away from the main piece or crystal, they open up successively new cleavages along which the sodium vapors may react and cause the warpage of more and more plates. It is possible by this process in the laboratory to exfoliate a flexible granular vermiculite into 100% micaceous flour of 300 mesh and less. It is doubtful if such a large yield could be obtained on a commercial scale within reasonable cost limits, but the yield of micaceous flour from any flexible vermiculite can be doubled or trebled with very little additional cost, by this method.

The action is very similar to the action caused in salt glazing ceramic ware with this difference:—The silica content of ceramic ware is much higher in relation to the alumina content than in vermiculite. This causes the surface of ceramic ware to become brightly glazed, while in the case of vermiculite the glaze is matt. The silica content of vermiculite is 40% to 45% and the alumina and iron content 20% to 30%. Such proportions produce matt effects. It is well known that glazing any thin piece of ceramic ware causes warpage due to shrinkage of the glazed face and the same action of warpage probably takes place when the crystal faces of thin plates of vermiculite are microscopically matt glazed by the sintering of sodium or other fluxes into them. Another explanation may be that the sodium being a strong base replaces some of the iron or other weaker bases in the crystal surfaces, thereby permitting more easy oxidation of such elements, and the subsequent weakening of the cleavages by this surface oxidation. This latter explanation is somewhat strengthened by the fact that sodium chloride vapors will produce in 2 to 5 minutes as much friability at 1600 degrees F. as roasting without sodium chloride will produce in an hour or more. Roasting at a temperature close to the point of incipient fusion will also make flexible tough vermiculite more or less friable. Time as well as temperatures is the important element of this process, as it takes many minutes at high heat to oxidize the crystal surfaces to such an extent that the material becomes friable. Of course, the tougher the cleavages of the vermiculite used the more difficult it is to get a large yield of friable material by this method.

Many other inorganic substances which vaporize to any extent at 1600 to 1800 degrees Fahrenheit or below may be used instead of sodium salts. Zinc oxide and lead salts have been found to be very effective as well as boric acid and sodium borate. Calcium oxide is moderately effective, but requires longer heating than the more vaporizable materials. Calcium fluoride is also quite effective.

The advantage of using strong bases, such as sodium, is that smaller quantities may be used and lower temperatures. If the exfoliation can be accomplished at 200 to 300 degrees Fahrenheit below the sintering point of the vermiculite, as it can be with sodium, there is little danger of over heating with general sintering and the process can be easily regulated.

I have secured best results by mixing the sodium chloride, zinc oxide or other flux, with the unexpanded vermiculite that has previously been graded to fairly even sized pieces. The material may be wetted with water or not. Wetting is advantageous with calcium oxide and similar slightly vaporizable materials, as it secures better distribution of the flux. The amount of sodium chloride or other flux used should average 50 to 200 pounds per ton of vermiculite. The more that is used, the less time is required for friable exfoliation, but an excess of flux lowers the melting point of the material and also increases the cost, both of which are objectionable features. For example: 600 pounds of sodium carbonate or zinc oxide to the ton of zonolite will produce completely friable material to 200 mesh in about 30 seconds at 1600 degrees. 100 pounds of the same materials to the ton of zonolite will produce 85% to 90% of material friable to 200 mesh in about 4 minutes at 1600 degrees Fahrenheit. The latter process is to be preferred because the material obtained has a higher melting point and the plates are more flexible and soft, as less flux has been sintered into the crystal faces. In the case where 600 pounds was used, there is a large loss of flux through vaporization and escape with the fuel gases.

An ideal arrangement for this method of treating vermiculites is a stationary oven or kiln which acts as a roasting chamber with a passageway for burning fuel gases into the kiln so designed that the vermiculite may be thrown or fed into this passage way. This flame duct is the hottest part of the arrangement, the temperature therein being probably 2000 degrees Fahrenheit or slightly over, and has a strong current of gases through it. As soon as the vermiculite expands and becomes lighter, which happens in about 2 to 10 seconds, it is blown into the roasting chamber by the draft where it is heat soaked for a period of time in contact with the flux vapors. If this roasting chamber is maintained at 1600 degrees, the soaking period should be about 4 minutes. The gas escaping should smell slightly of hydrochloric acid, if sodium chloride is used, but no white vapors of sodium chloride or zinc oxide, if it is used, should be visible or noticeable. In this way all the flux is used and none wasted. A suitable dumping arrangement is installed to dump the contents of the roasting chamber through the bottom without interrupting the feeding end, thereby making the process continuous.

The material thus heated is still in granular form. It is no longer gold color, but light tan. A piece crushed between the thumb and forefinger yields a light and fluffy powder. While the method may be carried out as described above, it is, of course, understood that other means for heating and agitating the vermiculite and the flux may be used. In any event the heating and agitation is continued until a period is reached when the flakes or pieces of vermiculite become expanded and their bright surfaces become dull and pearly and it is possible to crush the same in the manner referred to above. The heating is then suspended and the contents of the expanding chamber are discharged and cooled and the material is crushed by any desired mechanical means to the desired size. If an excess of sodium chloride is used and some still remains in the product it may be removed by washing the material with water.

The granules obtained by my method are not apparently any larger than granules obtained by rapid expansion by heat as ordinarily carried out. However, there is this important difference in the structure of the two. If a granule as ordinarily expanded, is cut across the laminations; that is, perpendicular to the cleavage, the cross section shows the air spaces between the laminations or scales to be of various sizes, ranging from 1/16 inch down to one invisible to the naked eye. The thickness of the scales is un-uniform also, some being as thick as 1/32 or 1/64 of an inch, if expanded by the old method.

A granule when expanded by my method, when examined in like manner, shows that the thicker scales have warped and sub-divided into a multiplicity of smaller and thinner scales which fill the larger air voids, making the whole granule quite homogeneous as to scale thickness and the spacing between the scales. Crosswise of the scales the granule has the appearance and feel of being pithy. Such even and small homogeneous air spaces make the granules expanded by this method superior in insulating qualities to the non-homogeneous flexible granules as obtained in ordinary expansion methods. For this reason where granules are used in insulating material for any purpose as described in my patent application Serial No. 636,334, filed October 5, 1932, such homogeneous granules are to be preferred. Brittle vermiculites expand into more homogeneous granules than flexible ones, but by using flexible vermiculites expanded by methods described above to make such granules, a wider control of both granule size and homogeneity is obtained, than by using natural brittle vermiculites.

The flaky flexible granular forms into which flexible vermiculites expand, are sometimes called "books" due to the laminated or leaf-like appearance of the granules. This leaf-like appearance is much less pronounced in a friable granule, and the word "granule" is more descriptive of such friable material than the word "book".

The heat treating of the vermiculite in the presence of hydroxides, oxides and/or salts of alkali metals and/or alkaline earth metals is preferred because the process can be controlled more easily, as a wider range of temperature can be employed without harmful results. In this application it is to be understood that the term "alkaline metals" shall include both the alkaline earth metals and alkali metals. The product can also be obtained by a roasting process without the addition of a flux or any material. This is accomplished by roasting the vermiculite after it has been completely de-hydrated at a temperature not more than 100 degrees Fahrenheit below the sintering point of the particular vermiculite employed. This roasting process is carried out as follows:—The vermiculite is expanded as quickly as possible at a high temperature below its sintering point. The more rapidly the vermiculite is expanded, the larger it will be in volume. Then the flakes are subjected to a roasting at a controlled temperature right at, or slightly below their point of incipient fusion for a period of time, varying from a minute or two, up to 15 or 20 minutes or more. The sintering point of known vermiculites ranges from about 1200 degrees to 2400 degrees Fahrenheit. Time and temperature are variable elements in this process, and the time required depends upon the nearness of the roasting temperature to the fusion point of the particular vermiculite that is being roasted, and should be within 100 degrees Fahrenheit or closer to the sintering point for a highly flexible vermiculite.

What I claim is—

1. The method of dividing vermiculite material into fine plate-like particles which consists in heating said vermiculite in the presence of salts of alkaline earth metals to expand the vermiculite, and then mechanically separating the expanded granules into plate-like particles.

2. The method of dividing vermiculite material into fine plate-like particles which consists in rapidly heating said vermiculite in the presence of salts of alkali metals to expand and make friable said vermiculite, and then mechanically separating the expanded vermiculite into plate-like particles.

3. The method of exfoliating vermiculite material, which consists in heating said vermiculite material at a temperature below its point of fusion in the presence of the salt of an alkaline metal which is volatilizable at said temperature.

4. In the method of exfoliating vermiculite material, which consists in heating said vermiculite material at a temperature below its sintering point in the presence of volatilized sodium chloride.

5. The method of treating a vermiculite material to increase the yield of thin plate-like scales therefrom, consisting in heating said vermiculite to a proper degree in an atmosphere containing a volatilized salt of an alkali metal in the proportion of from 50 to 200 pounds of salt to a ton of vermiculite until said vermiculite exfoliates sufficient to become friable without melting.

6. The method of exfoliating flexible vermiculite material which consists in introducing sodium chloride into a heating chamber with particles of vermiculite material, and heating below the sintering point of the vermiculite the contents of said chamber to volatilize the sodium chloride and until the vermiculite material becomes friable.

7. The method of exfoliating flexible vermiculite material which consists in introducing sodium chloride into a heating chamber with flexible vermiculite material, and heating the contents of said chamber at a temperature below the sintering point of said vermiculite and above the volatilization temperature of sodium chloride until the vermiculite exfoliates into such finely divided form that it becomes friable.

8. The method of exfoliating vermiculite material consisting in treating a mixture consisting of from 2½ to 10 per cent sodium chloride by weight and 97½ to 90 percent by weight of vermiculite material, and heating said mixture to a red heat and below the sintering point of the vermiculite.

9. The method of exfoliating flexible vermiculite material consisting in mixing from 2½ to 10 per cent sodium chloride by weight with 90 to 97½ per cent of vermiculite material, and heating said mixture at a temperature below the sintering point of said vermiculite until the vermiculite becomes friable.

10. The method of expanding vermiculite material which consists in heating particles of vermiculite material, having a sintering point above 2000 degrees Fahrenheit, and sodium chloride at a temperature of 1600 to 2000 degrees Fahrenheit until said particles of vermiculite become expanded and friable.

11. The method of producing a powder comprising thin plate-like scales from a flexible vermiculite material which consists in heating particles of said vermiculite at a temperature substantially at but below the sintering point thereof in the presence of a heat ionized salt of alkaline earth metal, until said flexible vermiculite becomes expanded and friable, then cooling and crushing said material.

12. The method of producing a powder comprising thin plate-like scales from a vermiculite material which consists in heating said vermiculite below its sintering point in the presence of a volatilizable salt of an alkali metal in the proportion of 50 to 200 pounds of said salt to a ton of vermiculite material until said flexible vermiculite becomes friable, then cooling and crushing said material.

13. The method of dividing vermiculite material into fine plate-like particles which consists in subjecting particles of vermiculite material to a heat of heat 1800 to 2200 degrees Fahrenheit for two to ten seconds, then lowering the temperature of said particles to 200 to 300 degrees Fahrenheit below said temperature and maintaining it at that temperature for from two to fifteen minutes in the presence of a volatilized salt of an alkali metal, and then mechanically separating the expanded vermiculite into plate-like particles.

14. The method of treating a vermiculite material to increase the yield of thin plate-like scales therefrom, the step of heating said vermiculite material at a temperature of between 1600 and 2000 degrees Fahrenheit in an atmosphere containing heat ionized gas, said gas having cathions of the alkaline metals therein.

15. The method of treating a vermiculite material free from alkaline metal carbonates to increase the yield of thin plate-like scales therefrom, the step of heating said vermiculite material at a temperature of between 1600 and 2000 degrees Fahrenheit in an atmosphere containing heat ionized alkaline metal.

16. The method of treating zonolite material to increase the yield of thin plate-like scales therefrom, the step of heating said zonolite material at a temperature of between 1600 and 2000 degrees Fahrenheit in an atmosphere containing heat ionized alkaline metal.

WILLIAM BERTHIER BYERS.